United States Patent
Liu et al.

(10) Patent No.: US 12,537,582 B2
(45) Date of Patent: Jan. 27, 2026

(54) METHOD FOR INFORMATION TRANSMISSION, METHOD FOR DETERMINING PRECODING GRANULARITY, TERMINAL AND BASE STATION

(71) Applicant: NTT DOCOMO, INC., Tokyo (JP)

(72) Inventors: Wenjia Liu, Beijing (CN); Xiaolin Hou, Beijing (CN); Xin Wang, Beijing (CN); Yuki Matsumura, Tokyo (JP); Nadisanka Rupasinghe, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 324 days.

(21) Appl. No.: 18/258,374

(22) PCT Filed: Dec. 29, 2020

(86) PCT No.: PCT/CN2020/140954
§ 371 (c)(1),
(2) Date: Jun. 20, 2023

(87) PCT Pub. No.: WO2022/141077
PCT Pub. Date: Jul. 7, 2022

(65) Prior Publication Data
US 2024/0039604 A1    Feb. 1, 2024

(51) Int. Cl.
*H04B 7/0456* (2017.01)
*H04B 7/06* (2006.01)

(52) U.S. Cl.
CPC ................. *H04B 7/0639* (2013.01)

(58) Field of Classification Search
CPC .. H04B 7/0456; H04B 7/0478; H04B 7/0479; H04B 7/048; H04B 7/0481; H04B 7/0639
See application file for complete search history.

(56) References Cited

U.S. PATENT DOCUMENTS

| | | | |
|---|---|---|---|
| 8,385,838 B2* | 2/2013 | Lee | H04B 7/066 |
| | | | 375/267 |
| 2020/0052750 A1 | 2/2020 | Manolakos et al. | |
| 2020/0106491 A1* | 4/2020 | Wu | H04L 1/16 |
| 2021/0167835 A1* | 6/2021 | Wang | H04B 7/10 |
| 2021/0273708 A1* | 9/2021 | Li | H04B 7/0452 |

FOREIGN PATENT DOCUMENTS

CN    108880644 A    11/2018

OTHER PUBLICATIONS

Written Opinion of the International Searching Authority issued in PCT/CN2020/140954, mailed Sep. 28, 2021 (6 pages).
International Search Report issued in Application No. PCT/CN2020/140954, mailed Sep. 28, 2021 (5 pages).

* cited by examiner

*Primary Examiner* — Frank Duong
(74) *Attorney, Agent, or Firm* — Osha Bergman Watanabe & Burton LLP (57) ABSTRACT

The present disclosure provides a method for precoding matrix indicator (PMI) transmission and a method for determining precoding granularity performed by a terminal, and a corresponding terminal and base station. The terminal includes: a receiving unit configured to receive first information about the precoding matrix indicator (PMI) from a base station of the communication system; and a control unit configured to determine whether to transmit second information about the precoding matrix indicator according to the first information, wherein the precoding matrix indicator is for a subcarrier-level precoding matrix.

7 Claims, 5 Drawing Sheets

METHOD FOR INFORMATION TRANSMISSION, METHOD FOR DETERMINING PRECODING GRANULARITY, TERMINAL AND BASE STATION

TECHNICAL FIELD

The present disclosure relates to a field of wireless communication, and more particularly, to a method for information transmission and a method for determining precoding granularity performed by a terminal, and a corresponding terminal and base station.

BACKGROUND

In order to improve throughput of a communication system, multi-antenna technology, such as Multiple Input Multiple Output (MIMO) technology, is proposed. In a scene where multi-antenna technology is applied, in order to effectively eliminate multi-user interference, improve system capacity, and reduce signal processing difficulty of a receiver, it is proposed to apply precoding technology at the transmitter side. In order to support precoding technology, a codebook is designed.

Release 15 (which may be abbreviated as R15) of 5G New Radio (NR) has designed two types of codebooks, namely Type I codebook and Type II codebook. In the case of applying Type I codebook, a wideband codeword is selected, and Co-phase for cross polarization is calculated for each subband. In the case of applying Type II codebook, a plurality of wideband codewords are selected, and complex Linear Combination (LC) coefficients for the plurality of codewords are calculated for each subband. In addition, in order to reduce feedback overhead associated with complex linear combination coefficients for all subbands, Release 16 (which may be abbreviated as R16) of NR has designed an enhanced Type II codebook, that is, a Frequency Domain (FD) compression scheme based on Discrete Fourier Transform (DFT) vectors is adopted to reduce feedback overhead.

However, the aforementioned codebooks are designed for subbands, so an operation based on the codebooks is a subband-level operation. In particular, in an example where the receiver is a terminal and the transmitter is a base station, the operation that the terminal determines a Precoding Matrix Indicator (PMI) and feeds back the PMI to the base station is a subband-level operation, or the operation (e.g., compression) that the terminal performs according to subband-level information (e.g., the LC coefficients mentioned above) is a subband-level operation, and the operation that the base station generates a precoding matrix according to the PMI is also a subband-level operation. Granularity of these operations is low, which limits performance of the communication system.

SUMMARY

According to an aspect of the present disclosure, a terminal is provided. The terminal comprises: a receiving unit configured to receive first information about a precoding matrix indicator (PMI) from a base station; and a control unit configured to determine whether to transmit second information about the precoding matrix indicator according to the first information, wherein the precoding matrix indicator is for a subcarrier-level precoding matrix.

According to another aspect of the present disclosure, a terminal is provided. The terminal comprises: a receiving unit configured to receive third information including a precoding granularity parameter from a base station; and a control unit configured to determine, according to the precoding granularity parameter, whether the base station has performed subcarrier-level precoding on downlink signals.

According to another aspect of the present disclosure, a base station is provided. The base station comprises: a control unit configured to determine a precoding granularity parameter, wherein the precoding granularity parameter is used to indicate whether downlink signals have undergone subcarrier-level precoding; and a transmitting unit configured to transmit third information including the precoding granularity parameter to a terminal.

According to another aspect of the present disclosure, a transmission method applied to a terminal is provided. The method comprises: receiving first information about a precoding matrix indicator (PMI) from a base station; and determining whether to transmit second information about the precoding matrix indicator according to the first information, wherein the precoding matrix indicator is for a subcarrier-level precoding matrix.

According to another aspect of the present disclosure, a method for determining precoding granularity applied to a terminal is provided. The method comprises: receiving third information including a precoding granularity parameter from a base station; and determining whether downlink signals have undergone subcarrier-level precoding according to the precoding granularity parameter.

BRIEF DESCRIPTION OF DRAWINGS

The above and other objects, features and advantages of the present disclosure will become more obvious by describing embodiments of the present disclosure in more detail in conjunction with accompanying drawings. The accompanying drawings are provided to provide a further understanding of the embodiments of the present disclosure, constitute a part of the specification, serve to explain the present disclosure together with the embodiments of the present disclosure, and do not constitute a limitation of the present disclosure. In the drawings, like reference numerals usually represent like components or steps.

DETAILED DESCRIPTION

In order to make the objects, technical solutions and advantages of the present disclosure more obvious, exemplary embodiments according to the present disclosure will be described in detail below with reference to the accompanying drawings. Like reference numerals refer to like elements throughout the drawings. It should be appreciated that the embodiments described herein are merely illustrative and should not be construed as limiting the scope of the present disclosure.

Figure 1:
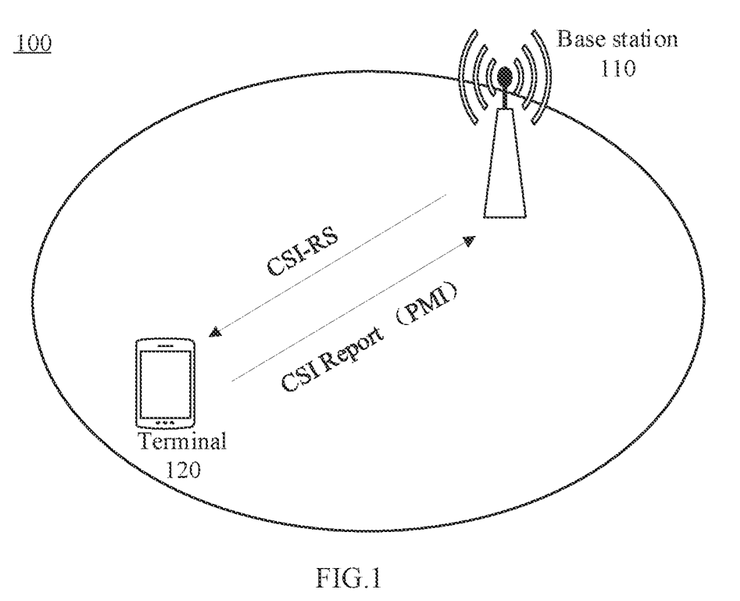
FIG. 1 shows a schematic diagram of a wireless communication system in which the embodiments of the present disclosure may be applied.

First, a wireless communication system in which the embodiments of the present disclosure may be applied will be described with reference to FIG. 1. FIG. 1 shows a schematic diagram of a wireless communication system in which the embodiments of the present disclosure may be applied. The wireless communication system 100 shown in FIG. 1 may be a 5G communication system, or any other type of wireless communication system, such as a 6G communication system. Hereinafter, the embodiments of the present disclosure are described by taking a 5G communication system as an example, but it should be recognized that the following description may also be applied to other types of wireless communication systems.

As shown in FIG. 1, the wireless communication system 100 may include a base station 110 and a terminal 120, and the base station 110 is a serving base station of the terminal 120. The base station 110 may transmit a Channel State Information Reference Signal (CSI-RS) to the terminal 120. The terminal 120 may measure the CSI-RS, determine a channel condition according to a measurement result, and determine a Precoding Matrix Indicator (PMI). The terminal 120 may include the PMI in a CSI report and transmit the CSI report to the base station 110, thus realizing feedback of the PMI to the base station 110. The base station 110 may generate a precoding matrix according to the PMI, and then apply the precoding matrix in downlink transmission from the base station 110 to the terminal 120.

The base station described herein may provide communication coverage for a specific geographical area, which may be called a cell, a Node B, a gNB, a 5G Node B, an access point and/or a transmitting and receiving point, etc. The terminals described herein may include various types of terminals, such as User Equipment (UE), mobile terminals (or referred to as mobile stations) or fixed terminals, however, for convenience, terminals and UE are sometimes used interchangeably hereinafter.

It should be recognized that although only one base station and one terminal are shown in FIG. 1, the wireless communication system may include more base stations and/or more terminals, one base station may serve multiple terminals, and one terminal may also be served by multiple base stations.

In the process of determining PMI by the terminal described above, the terminal uses a corresponding codebook according to configuration. In the prior art, codebooks are designed for sub-bands of the wireless communication system, and accordingly, precoding and/or CSI feedback are subband-level operations. Granularity of these operations is low, which limits performance of the communication system. In order to overcome the defects in the prior art, the present disclosure proposes a subcarrier-level precoding technology, which improves operation granularity, thereby improving performance of the communication system.

Figure 2:
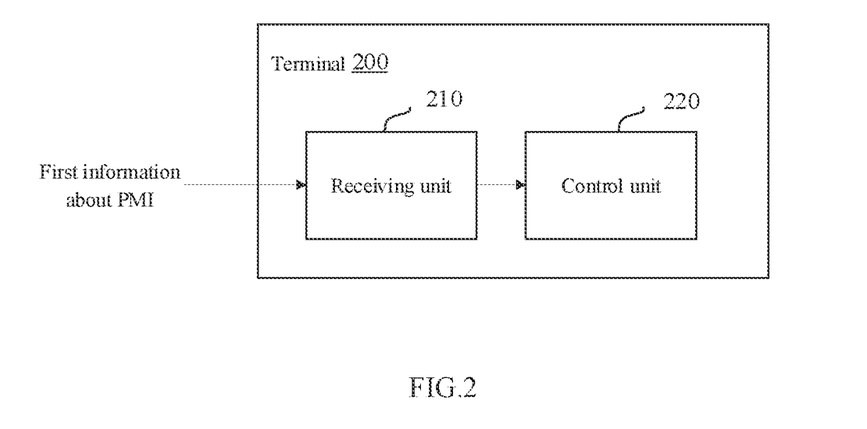
FIG. 2 is a schematic block diagram illustrating a terminal according to an embodiment of the present disclosure.

A terminal according to an embodiment of the present disclosure will be described below with reference to FIG. 2. FIG. 2 is a schematic block diagram illustrating a terminal 200 according to an embodiment of the present disclosure. As shown in FIG. 2, the terminal 200 according to an embodiment of the present disclosure may include a receiving unit 210 and a control unit 220. In addition to the receiving unit and the control unit, the terminal 200 may further include other components, however, since these components are irrelevant to the contents of the embodiment of the present disclosure, illustrations and descriptions thereof are omitted herein.

As shown in FIG. 2, the receiving unit 210 of the terminal 200 may receive first information about a Precoding Matrix Indicator (PMI) from a base station. The control unit 220 may determine whether to transmit second information about the precoding matrix indicator according to the received first information, where the precoding matrix indicator is for a subcarrier-level precoding matrix. That is, the control unit 220 may determine whether to transmit the second information about the Precoding Matrix Indicator (PMI) for subcarrier-level according to the received first information. Transmitting the second information of the PMI for a subcarrier-level precoding matrix means, for example, determining the precoding matrix in units of one or more subcarriers, and feeding back the second information about the determined precoding matrix.

According to an example of the present disclosure, when the first information received by the receiving unit 210 includes a precoding feedback granularity indication parameter, the control unit 220 may determine to transmit the second information about the precoding matrix indicator, where the precoding matrix indicator is for a subcarrier-level precoding matrix. For example, the base station may indicate whether the UE 200 needs to feed back the second information about PMI for a subcarrier-level precoding matrix through the precoding feedback frequency-domain granularity indication parameter PMIfreq-granularity. When the base station wants the terminal 200 to feed back the second information about PMI for a subcarrier-level precoding matrix, the precoding feedback frequency-domain granularity indication parameter PMIfreq-granularity may be included in the first information; and, when the base station does not want the terminal 200 to feed back information about PMI for a subcarrier-level precoding matrix, for example, when the base station wants the terminal 200 to feed back information about PMI for a subband-level precoding matrix, the precoding feedback frequency-domain granularity indication parameter PMIfreq-granularity may not be included in the first information, and vice versa. Accordingly, when the first information received by the receiving unit 210 includes the precoding feedback frequency-domain granularity indication parameter PMIfreq-granularity, the control unit 220 may determine to transmit the second information about PMI for a subcarrier-level precoding matrix; and conversely, when the precoding feedback frequency-domain granularity indication parameter PMIfreq-granularity is not included in the received first information, the control unit 220 may determine to feed back information about PMI in a traditional way (e.g., transmit information about PMI for a subband-level precoding matrix).

According to another example of the present disclosure, the control unit 220 may determine whether to transmit the second information about the precoding matrix indicator according to a value of the precoding feedback granularity indication parameter in the first information, where the precoding matrix indicator is for a subcarrier-level precoding matrix. For example, the first information may include the precoding feedback frequency-domain granularity indication parameter PMIfreq-granularity, and the value of PMIfreq-granularity may be 0 or 1. When the base station wants the terminal 200 to feed back the second information about PMI for a subcarrier-level precoding matrix, the value of the precoding feedback frequency-domain granularity indication parameter PMIfreq-granularity may be set to 1; and when the base station does not want the terminal 200 to feed back the second information about PMI for a subcarrier-level precoding matrix, for example, when the base station wants the terminal 200 to feed back information about PMI for a subband-level precoding matrix, the value of the precoding feedback frequency-domain granularity indication parameter PMIfreq-granularity may be set to 0, and vice versa. Accordingly, when the value of the precoding feedback frequency-domain granularity indication parameter PMIfreq-granularity in the received first information is 1, the control unit 220 may determine to transmit the second information about PMI for a subcarrier-level precoding matrix; and conversely, when the value of the precoding feedback frequency-domain granularity indication parameter PMIfreq-granularity in the received first information is 0, the control unit 220 may determine to feed back information about PMI in a traditional way (e.g., transmit information about PMI for a subband-level precoding matrix).

As another example, a value range of the precoding feedback frequency-domain granularity indication parameter PMIfreq-granularity may be set {'Subband', 'Subcarrier'}. When the base station wants the terminal 200 to feed back the second information about PMI for a subcarrier-level precoding matrix, the value of the precoding feedback frequency-domain granularity indication parameter PMIfreq-granularity may be set to 'Subcarrier'; and when the base station wants the terminal 200 to feed back information about PMI for a subband-level precoding matrix, the value of the precoding feedback frequency-domain granularity indication parameter PMIfreq-granularity may be set to 'Subband'. Accordingly, when the value of the precoding feedback frequency-domain granularity indication parameter PMIfreq-granularity in the received first information is 'Subcarrier', the control unit 220 may determine to transmit the second information about PMI for a subcarrier-level precoding matrix; and conversely, when the value of the precoding feedback frequency-domain granularity indication parameter PMIfreq-granularity in the received first information is 'Subband', the control unit 220 may determine to feed back information about PMI for a subband-level precoding matrix. Alternatively, the base station may determine the precoding feedback frequency-domain granularity indication parameter PMIfreq-granularity in the first information according to precoding processing capability of at least one of the terminal and the base station. For example, when the base station determines that at least one of the base station and terminals communicating with it supports subcarrier-level precoding, the precoding feedback frequency-domain granularity indication parameter PMIfreq-granularity may be included in the first information, or may be set to indicate transmission of the second information about the precoding matrix indicator, where the precoding matrix indicator is a specific value for a subcarrier-level precoding matrix. On the contrary, the precoding feedback frequency-domain granularity indication parameter PMIfreq-granularity may not be included in the first information, or may be set to a value indicating transmission of information about feeding back the precoding matrix indicator in a traditional way.

In addition, the precoding feedback granularity indication parameter may not be set, and an existing parameter about PMI in current communication system may be utilized to determine whether to transmit the second information about PMI for a subcarrier-level precoding matrix. According to an example of the present disclosure, values of the existing parameter about PMI may be extended, so that whether to transmit the second information about PMI for a subcarrier-level precoding matrix is indicated by newly defined values of the existing parameter. For example, a parameter R about the number of precoding matrices indicated by the precoding matrix indicator is set in 3GPP Release 16. The parameter R is configured to control the total number of precoding matrices represented by PMI. At present, the value of parameter R may be 1 or 2 according to 3GPP Release 16. In particular, R=1 means that PMI indicates one precoding matrix for each subband in parameter csi-ReportingBand. R=2 means that PMI indicates two precoding matrices for each subband except a first and second subbands in Bandwidth Part (BWP). In an example according to the present disclosure, the value of the parameter R may be extended. The control unit 220 determines whether to transmit the second information about PMI for a subcarrier-level precoding matrix according to the parameter R.

For example, when the value of the parameter R is greater than a value of the number of Resource Blocks (RBs) in one CQI subband, the control unit 220 may determine to transmit the second information about PMI for a subcarrier-level precoding matrix. In particular, assuming that one CQI subband includes 16 RBs, a value range of the parameter R may be extended to (1, 2, 4, 8, 16, 32). When R=32, the control unit 220 determines to transmit the second information about PMI for a subcarrier-level precoding matrix according to the parameter R. For example, when R=32, the control unit 220 may determine that PMI indicates a corresponding precoding matrix for one or more subcarriers, and determine to transmit the second information about the PMI for this subcarrier-level precoding matrix. When R=1, 2, 4, 8 or 16, the control unit 220 determines that subband-level precoding of 1, 2, 4, 8 or 16 precoding matrices is supported in one CQI subband with 16 RBs according to the parameter R.

As another example, when the value of the parameter R is specified in advance, the control unit 220 may determine to transmit an indication to a subcarrier-level precoding matrix. In particular, it is assumed that the value range of the parameter R is extended to {0, 1, 2, 4, . . . }. When R=0, the control unit 220 may determine to transmit the second information about PMI for a subcarrier-level precoding matrix. For example, when R=0, the control unit 220 may determine that PMI indicates a corresponding precoding matrix for one or more subcarriers, and determine to transmit the second information about the PMI for this subcarrier-level precoding matrix. When R=other values, the control unit 220 may determine that subband-level precoding of 1, 2, 4, 8 or 16 precoding matrices is supported in one CQI subband with 16 RBs.

The first information described above may be, for example, at least one of Downlink Control Information (DCI) signaling. Radio Resource Control (RRC) signaling or Media Access Control Layer Control Element (MAC CE) transmitted by the base station to the terminal 200.

Furthermore, when it is determined to transmit the second information about PMI for a subcarrier-level precoding matrix according to the first information, the control unit 220 may also perform subcarrier-level measurement and estimation of channel state information according to a reference signal. For example, when the control unit 220 determines to transmit the second information about PMI for a subcarrier-level precoding matrix according to the first information, the reference signal may be CSI-RS for subcarrier-level channel estimation. The CSI-RS may be defined in the 3GPP standard or in other forms. In addition, the reference signal may be other reference signals besides CSI-RS. The other reference signals may be configured at different subcarrier positions.

Furthermore, in the case that the wireless communication system supports subcarrier-level precoding and/or CSI feedback, the terminal is configured to select, from a first number of candidate transform domain vectors, a second number of transform domain vectors and report the selected second number of transform domain vectors to the base station (e.g., information for indicating the selected second number of transform domain vectors is used as a part of a precoding matrix indicator). In a precoding method for subbands, candidate transform domain vectors may be determined according to the number of subbands. Similar to the precoding method for subbands, in a precoding method for subcarriers, the first number may be the number of subcarriers of the wireless communication system. The second number is a value determined at least based on a rank corresponding to the terminal. However, since one subband may include a plurality of subcarriers, the number of subcarriers in the wireless communication system is larger than the number of subbands in the wireless communication system, that is, the first number mentioned above is larger. When the first number is larger, selecting the second number of transform domain vectors from the first number of candidate transform domain vectors and reporting the selected second number of transform domain vectors to the base station result in a large feedback overhead. Therefore, how to reduce the feedback overhead is a considerable aspect.

In order to reduce the feedback overhead, according to an example of the present disclosure, a new parameter, namely a first parameter, is introduced, and the number of candidate transform domain vectors for the precoding matrix is reduced from the number of subcarriers of the communication system (e.g., it may be expressed as Ni) to a value of the first parameter. Since the number of candidate transform domain vectors for the precoding matrix is reduced, selecting transform domain vectors used to determine the precoding matrix from the candidate transform domain vectors and feeding back the selected transform domain vectors to the base station result in correspondingly reduced feedback overhead.

In particular, the receiving unit 210 of the terminal 200 may receive information for indicating the first parameter from the base station, where the first parameter indicates the number of candidate transform domain vectors for a subcarrier-level precoding matrix, and the value of the first parameter is smaller than the number of subcarriers of the communication system. Furthermore, the receiving unit 210 may also receive information for indicating a second parameter from the base station, where the second parameter indicates the number of transform domain vectors used to determine the subcarrier-level precoding matrix. Then, the control unit 220 may determine the number of transform domain vectors indicated by the information indicating the second parameter from the number of candidate transform domain vectors indicated by the information indicating the first parameter. For example, the first parameter may be expressed as $M_{max}$, and its value is smaller than the number of subcarriers of the communication system.

Furthermore, according to another example of the present disclosure, the terminal 200 may further include a transmitting unit. In the case that the terminal 200 determines to transmit the second information about PMI for a subcarrier-level precoding matrix according to the received first information, the transmitting unit transmits the information about PMI determined by the control unit 220 to the base station. For example, when determining to transmit the second information about PMI for a subcarrier-level precoding matrix according to the received first information, the control unit 220 may also determine at least one set of transform domain vectors, where the at least one set of transform domain vectors is used to process factors associated with a plurality of spatial domain vectors, and the plurality of spatial domain vectors are used to determine the subcarrier-level precoding matrix. Then, the transmitting unit of the terminal may transmit the second information about PMI for the subcarrier-level precoding matrix to the base station, where the second information is used to indicate the at least one set of transform domain vectors.

According to another aspect of the present disclosure, the base station may precode downlink signals to be transmitted by using the received second information about PMI for a subcarrier-level precoding matrix. According to another embodiment of the present disclosure, the terminal may determine whether the base station has performed subcarrier-level precoding on the downlink signals through the precoding granularity parameter.

Figure 3:
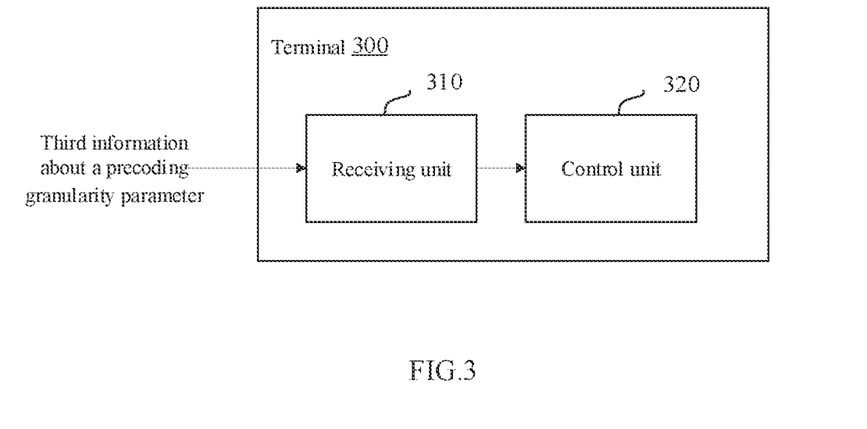
FIG. 3 is a schematic block diagram illustrating a terminal according to an embodiment of the present disclosure.

A terminal according to another embodiment of the present disclosure will be described below with reference to FIG. 3. FIG. 3 is a schematic block diagram illustrating a terminal 300 according to an embodiment of the present disclosure. As shown in FIG. 3, the terminal 300 according to an embodiment of the present disclosure may include a receiving unit 310 and a control unit 320. In addition to the receiving unit and the control unit, the terminal 300 may further include other components, however, since these components are irrelevant to the contents of the embodiment of the present disclosure, illustration and description thereof are omitted herein.

As shown in FIG. 3, the receiving unit 310 may receive third information including a precoding granularity parameter from a base station in the communication system. The control unit 320 may determine whether the base station has performed subcarrier-level precoding on downlink signals according to the precoding granularity parameter in the received third information. For example, a value range of the precoding frequency-domain granularity parameter $P'_{BWP,i}$ may be preset as {2, 4, Broadband, Subcarrier}. When the precoding frequency-domain granularity parameter $P'_{BWP,i}$ of the third information received by the receiving unit 310=Subcarrier, the control unit 320 may determine whether the base station has performed subcarrier-level precoding on downlink signals according to the precoding frequency-domain granularity parameter. Alternatively, a specific value may be used to indicate the Subcarrier in the above-mentioned value range. For example, when $P'_{BWP,i}=0$, the precoding frequency-domain granularity may be indicated as subcarrier level.

According to an example of the present disclosure, in the case described above that the terminal 200 determines to transmit the second information about PMI for a subcarrier-level precoding matrix, the terminal 200 may include a transmitting unit to transmit the second information to the base station. And the base station may precode downlink signals to be transmitted by using the received second information. The base station may perform subcarrier-level precoding according to the received second information about PMI for a subcarrier-level precoding matrix. Alternatively, even in the case of receiving the second information about PMI for a subcarrier-level precoding matrix, the base station may perform conventional subband-level precoding without performing subcarrier-level precoding. As described above, the base station may indicate its precoding granularity for downlink signals through the precoding granularity parameter. And the terminal may determine whether the base station has performed subcarrier-level precoding on the downlink signals according to the precoding granularity parameter in the received third information.

Figure 4:
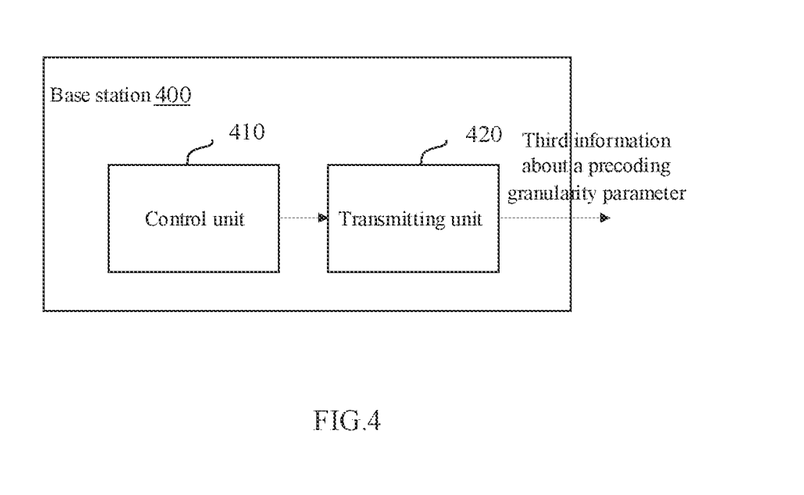
FIG. 4 is a schematic block diagram illustrating a base station according to an embodiment of the present disclosure.

A base station 400 corresponding to the terminal 300 shown in FIG. 3 will be further described below with reference to FIG. 4. FIG. 4 is a schematic block diagram illustrating the base station 400 according to an embodiment of the present disclosure. As shown in FIG. 4, a base station 400 according to an embodiment of the present disclosure may include a control unit 410 and a transmitting unit 420. In addition to the transmitting unit and the control unit, the base station 400 may further include other components, however, since these components are irrelevant to the contents of the embodiment of the present disclosure, illustration and description thereof are omitted herein.

As shown in FIG. 4, the control unit 410 may determine a precoding granularity parameter, where the precoding granularity parameter is used to indicate whether downlink signals have undergone subcarrier-level precoding. As described above, a value range of a precoding frequency-domain granularity parameter $P'_{BWP,i}$ may be preset as {2, 4, Broadband, Subcarrier}. When the base station performs subcarrier-level precoding on downlink signals, the control unit 410 may determine the precoding frequency-domain granularity parameter $P'_{BWP,i}$=Subcarrier. Then the transmitting unit 420 may transmit third information including the precoding frequency-domain granularity parameter to the terminal. The third information may be, for example, at least one of Downlink Control Information (DCI) signaling. Radio Resource Control (RRC) signaling or Media Access Control Layer Control Element (MAC CE).

According to an example of the present disclosure, the control unit 410 may determine the precoding granularity parameter according to precoding processing capability of at least one of the terminal and the base station. For example, when the base station does not support subcarrier-level precoding, the control unit 410 may determine the value of the precoding granularity parameter only in {2, 4, Broadband} even in the case of receiving the second information about PMI for a subcarrier-level precoding matrix.

Figure 5:
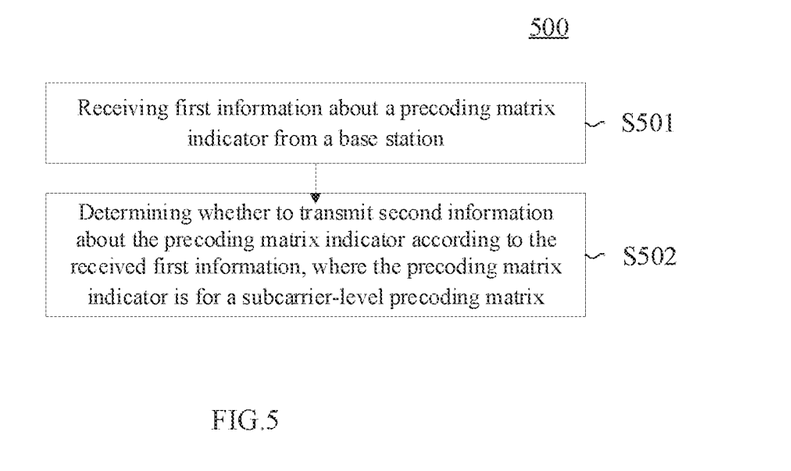
FIG. 5 is a flowchart of a method for transmitting a precoding matrix indicator according to an embodiment of the present disclosure.

Next, a method for transmitting a precoding matrix indicator according to an embodiment of the present disclosure will be described with reference to FIG. 5. FIG. 5 is a flowchart of a method 500 for transmitting a precoding matrix indicator according to an embodiment of the present disclosure. Since steps of the method 500 for transmitting a precoding matrix indicator correspond to the operations of the terminal 200 described above with reference to the figure, a detailed description of the same content is omitted herein for the sake of simplicity.

As shown in FIG. 5, in step S501, first information about PMI is received from a base station. Then, in step S502, whether to transmit second information about the precoding matrix indicator may be determined according to the received first information, where the precoding matrix indicator is for a subcarrier-level precoding matrix. That is, the control unit 220 may determine whether to transmit the second information about the Precoding Matrix Indicator (PMI) for subcarrier-level according to the received first information. Transmitting PMI for a subcarrier-level precoding matrix means, for example, determining the precoding matrix in units of one or more subcarriers, and feeding back the second information about the determined precoding matrix.

According to an example of the present disclosure, when the first information received in step S501 includes a precoding feedback granularity indication parameter, it may be determined to transmit the second information about the precoding matrix indicator in step S502, where the precoding matrix indicator is for a subcarrier-level precoding matrix. For example, the base station may indicate whether a terminal needs to feed back the second information about PMI for a subcarrier-level precoding matrix through the precoding feedback frequency-domain granularity indication parameter PMIfreq-granularity. When the received first information includes the precoding feedback frequency-domain granularity indication parameter PMIfreq-granularity, it may be determined to transmit the second information about PMI for a subcarrier-level precoding matrix in step S502; and conversely, when the precoding feedback frequency-domain granularity indication parameter PMIfreq-granularity is not included in the received first information, it may be determined to feed back information about PMI in a traditional way in step S502.

According to another example of the present disclosure, whether to transmit the second information about the precoding matrix indicator may be determined according to a value of the precoding feedback granularity indication parameter in the first information in step S502, where the precoding matrix indicator is for a subcarrier-level precoding matrix. For example, the first information may include the precoding feedback frequency-domain granularity indication parameter PMIfreq-granularity, and the value of PMIfreq-granularity may be 0 or 1. When the base station wants the terminal 200 to feed back the second information about PMI for a subcarrier-level precoding matrix, the value of the precoding feedback frequency-domain granularity indication parameter PMIfreq-granularity may be set to 1; and when the base station does not want the terminal 200 to feed back the second information about PMI for a subcarrier-level precoding matrix, for example, when the base station wants the terminal 200 to feed back information about PMI for a subband-level precoding matrix, the value of the precoding feedback frequency-domain granularity indication parameter PMIfreq-granularity may be set to 0, and vice versa. Accordingly, when the value of the precoding feedback frequency-domain granularity indication parameter PMIfreq-granularity in the received first information is 1, it may be determined to transmit the second information about PMI for a subcarrier-level precoding matrix in step S502; and conversely, when the value of the precoding feedback frequency-domain granularity indication parameter PMIfreq-granularity in the received first information is 0, it may be determined to feed back information about PMI in a traditional way (e.g., transmit information about PMI for a subband-level precoding matrix) in step S502.

As another example, a value range of the precoding feedback frequency-domain granularity indication parameter PMIfreq-granularity may be set {'Subband', 'Subcarrier'}. When the base station wants the terminal to feed back the second information about PMI for a subcarrier-level precoding matrix, the value of the precoding feedback frequency-domain granularity indication parameter PMIfreq-granularity may be set to 'Subcarrier'; and when the base station wants the terminal to feed back information about PMI for a subband-level precoding matrix, the value of the precoding feedback frequency-domain granularity indication parameter PMIfreq-granularity may be set to 'Subband'. Accordingly, when the value of the precoding feedback frequency-domain granularity indication parameter PMIfreq-granularity in the received first information is 'Subcarrier', it may be determined to transmit the second information about PMI for a subcarrier-level precoding matrix in step S502; and conversely, when the value of the precoding feedback frequency-domain granularity indication parameter PMIfreq-granularity in the received first information is 'Subband', it may be determined to feed back information about PMI for a subband-level precoding matrix in step S502. Alternatively, the base station may determine the precoding feedback frequency-domain granularity indication parameter PMIfreq-granularity in the first information according to precoding processing capability of at least one of the terminal and the base station. For example, when the base station determines that at least one of the base station and terminals communicating with it supports subcarrier-level precoding, the precoding feedback frequency-domain granularity indication parameter PMIfreq-granularity may be included in the first information, or may be set to indicate transmission of the second information about the precoding matrix indicator, where the precoding matrix indicator is a specific value for a subcarrier-level precoding matrix. On the contrary, the precoding feedback frequency-domain granularity indication parameter PMIfreq-granularity may not be included in the first information, or may be set to a value indicating transmission of information about feeding back the precoding matrix indicator in a traditional way.

In addition, the precoding feedback granularity indication parameter PMIfreq-granularity may not be set, and an existing parameter about PMI in a current communication system may be utilized to determine whether to transmit the second information about PMI for a subcarrier-level precoding matrix. According to an example of the present disclosure, values of the existing parameter about PMI may be extended, so that whether to transmit the second information about PMI for a subcarrier-level precoding matrix is indicated by newly defined values of the existing parameter. For example, a parameter R about the number of precoding matrices indicated by the precoding matrix indicator is set in 3GPP Release 16. The parameter R is configured to control the total number of precoding matrices represented by PMI. At present, the value of parameter R may be 1 or 2 according to 3GPP Release 16. In particular, R=1 means that PMI indicates one precoding matrix for each subband in parameter csi-ReportingBand. R=2 means that PMI indicates two precoding matrices for each subband except a first and second subbands in Bandwidth Part (BWP). In an example according to the present disclosure, the value of the parameter R may be extended. It may be determined whether to transmit the second information about PMI for a subcarrier-level precoding matrix according to the parameter R in step S502.

For example, when the value of the parameter R is greater than a value of the number of Resource Blocks (RBs) in one CQI subband, it may be determined to transmit the second information about PMI for a subcarrier-level precoding matrix in step S502. In particular, assuming that one CQI subband includes 16 RBs, a value range of the parameter R may be extended to {1, 2, 4, 8, 16, 32}. When R=32, it may be determined to transmit the second information about PMI for a subcarrier-level precoding matrix according to the parameter R in step S502. For example, when R=32, it may be determined that PMI indicates a corresponding precoding matrix for one or more subcarriers, and determined to transmit the second information about the PMI for this subcarrier-level precoding matrix in step S502. When R=1, 2, 4, 8 or 16, it may be determined that subband-level precoding of 1, 2, 4, 8 or 16 precoding matrices is supported in one CQI subband with 16 RBs according to the parameter R in step S502.

As another example, when the value of the parameter R is specified in advance, it may be determined to transmit an indication to a subcarrier-level precoding matrix in step S502. In particular, it is assumed that the value range of the parameter R is extended to {0, 1, 2, 4, . . . }. When R=0, it may be determined to transmit the second information about PMI for a subcarrier-level precoding matrix in step S502. For example, when R=0, the control unit 220 may determine that PMI indicates a corresponding precoding matrix for one or more subcarriers, and determine to transmit the second information about the PMI for this subcarrier-level precoding matrix. When R=other values, it may be determined that subband-level precoding of 1, 2, 4, 8 or 16 precoding matrices is supported in one CQI subband with 16 RBs in step S502.

The first information described above may be, for example, at least one of Downlink Control Information (DCI) signaling, Radio Resource Control (RRC) signaling or Media Access Control Layer Control Element (MAC CE) transmitted by the base station to the terminal 200.

Furthermore, when it is determined to transmit the second information about PMI for a subcarrier-level precoding matrix according to the first information in step S502, the method shown in FIG. 5 may further comprise performing subcarrier-level measurement and estimation of channel state information according to a reference signal. For example, when it is determined to transmit the second information about PMI for a subcarrier-level precoding matrix according to the first information in step S502, the reference signal may be CSI-RS for subcarrier-level channel estimation. The CSI-RS may be defined in the 3GPP standard or in other forms. In addition, the reference signal may be other reference signals besides CSI-RS. The other reference signals may be configured at different subcarrier positions.

Furthermore, in order to reduce feedback overhead, according to an example of the present disclosure, a new parameter, namely a first parameter, is introduced, and the number of candidate transform domain vectors for the precoding matrix is reduced from the number of subcarriers of the communication system (e.g., it may be expressed as $N_3$) to a value of the first parameter. Since the number of candidate transform domain vectors for the precoding matrix is reduced, selecting transform domain vectors used to determine the precoding matrix from the candidate transform domain vectors and feeding back the selected transform domain vectors to the base station result in correspondingly reduced feedback overhead.

In particular, the method 500 shown in FIG. 5 may further comprise receiving information for indicating the first parameter from the base station of the communication system, where the first parameter indicates the number of candidate transform domain vectors for a subcarrier-level precoding matrix, and the value of the first parameter is smaller than the number of subcarriers of the communication system and larger than the number of subbands of the communication system. Furthermore, information for indicating a second parameter is received from the base station, where the second parameter indicates the number of transform domain vectors used to determine the subcarrier-level precoding matrix. Then, the number of transform domain vectors indicated by the information indicating the second parameter may be determined from the number of candidate transform domain vectors indicated by the information indicating the first parameter. For example, the first parameter may be expressed as $M_{max}$, and its value is smaller than the number of subcarriers of the communication system.

Furthermore, according to another example of the present disclosure, in the case that the terminal determines to transmit the second information about PMI for a subcarrier-level precoding matrix according to the received first information, the method 500 may further comprise transmitting the determined information about PMI to the base station. For example, when it is determined to transmit the second information about PMI for a subcarrier-level precoding matrix according to the received first information, the method 500 may further comprise determining at least one set of transform domain vectors, where the at least one set of transform domain vectors is used to process factors associated with a plurality of spatial domain vectors, and the plurality of spatial domain vectors are used to determine the subcarrier-level precoding matrix. Then, the second information about PMI for the subcarrier-level precoding matrix may be transmitted to the base station, where the second information is used to indicate the at least one set of transform domain vectors.

According to another aspect of the present disclosure, the base station may precode downlink signals to be transmitted by using the received second information about PMI for a subcarrier-level precoding matrix. According to another embodiment of the present disclosure, the terminal may determine whether the base station has performed subcarrier-level precoding on the downlink signals through the precoding granularity parameter.

Figure 6:
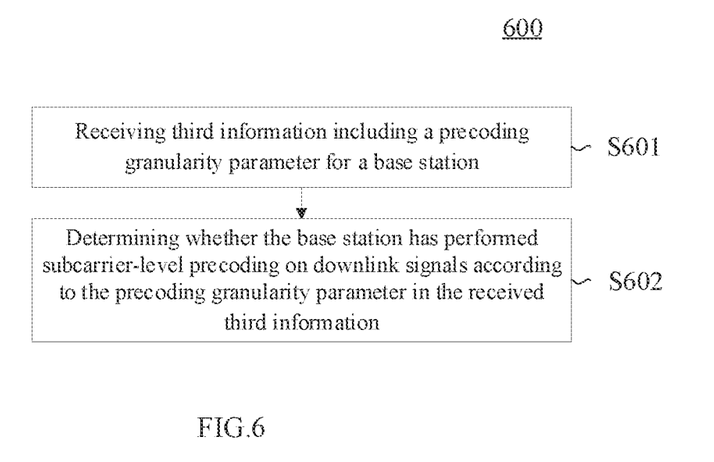
FIG. 6 is a flowchart of a method for determining precoding granularity according to an embodiment of the present disclosure.

A method for determining precoding granularity according to the present disclosure will be described below with reference to FIG. 6. FIG. 6 is a flowchart of a method 600 for determining precoding granularity according to an embodiment of the present disclosure. Since steps of the method 600 for determining precoding granularity correspond to the operations of the terminal 300 described above with reference to the figure, a detailed description of the same content is omitted herein for the sake of simplicity.

As shown in FIG. 6, in step S601, third information including the precoding granularity parameter may be received from a base station. Then, in step S602, whether the base station has performed subcarrier-level precoding on downlink signals may be determined according to the precoding granularity parameter in the received third information. For example, a value range of the precoding frequency-domain granularity parameter $P'_{BWP,i}$ may be preset as {2, 4, Broadband, Subcarrier}. When the precoding frequency-domain granularity parameter $P'_{BWP,i}$ of the third information received in step S601=Subcarrier, it may be determined whether the base station has performed subcarrier-level precoding on downlink signals according to the precoding granularity parameter in step S602. Alternatively, a specific value may be used to indicate the Subcarrier in the above-mentioned value range. For example, when $P'_{BWP,i}=0$, the precoding granularity may be indicated as subcarrier level.

According to an example of the present disclosure, in the case described above that a terminal determines to transmit the second information about PMI for a subcarrier-level precoding matrix, the terminal may transmit the second information to the base station. And the base station may precode downlink signals to be transmitted by using the received second information. The base station may perform subcarrier-level precoding on downlink signals to be transmitted according to the received second information about PMI for a subcarrier-level precoding matrix. Alternatively, even in the case of receiving the second information about PMI for a subcarrier-level precoding matrix, the base station may perform conventional subband-level precoding without performing subcarrier-level precoding. As described above, the base station may indicate its precoding granularity for downlink signals through the precoding granularity parameter. And the terminal may determine whether the base station has performed subcarrier-level precoding on the downlink signals according to the precoding granularity parameter in the received third information.

Figure 7:
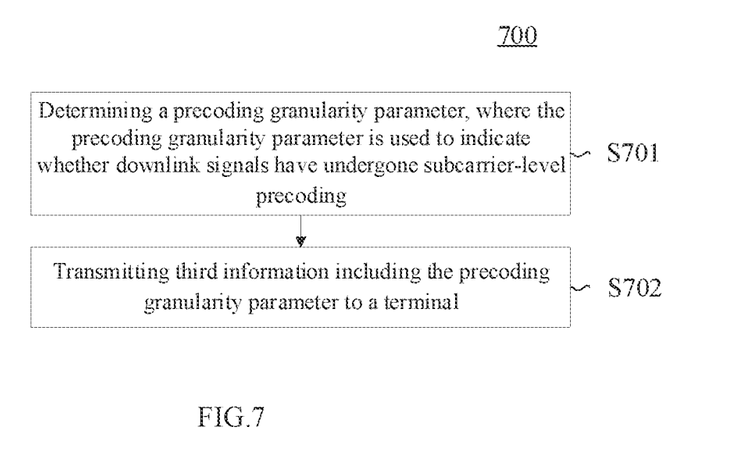
FIG. 7 is a flowchart of a method for indicating precoding granularity according to an embodiment of the present disclosure.

A method for indicating a precoding granularity parameter corresponding to the method for determining precoding granularity performed by a terminal shown in FIG. 6 will be further illustrated below with reference to FIG. 7. FIG. 7 is a flowchart of a method 700 for indicating a precoding granularity according to an embodiment of the present disclosure. Since steps of the method 700 for indicating a precoding granularity correspond to the operations of the base station 500 described above with reference to the figure, a detailed description of the same content is omitted herein for the sake of simplicity.

As shown in FIG. 7, in step S701, a precoding granularity parameter may be determined, where the precoding granularity parameter is used to indicate whether downlink signals have undergone subcarrier-level precoding. As described above, a value range of a precoding frequency-domain granularity parameter $P'_{BWP,i}$ may be preset as {2, 4, Broadband, Subcarrier}. When the base station performs subcarrier-level precoding on downlink signals, it may be determined that the precoding frequency-domain granularity parameter $P'_{BWP,i}$=Subcarrier in step S701. Then in step S702, third information including the precoding frequency-domain granularity parameter may be transmitted to the terminal. The third information may be, for example, at least one of Downlink Control Information (DCI) signaling, Radio Resource Control (RRC) signaling or Media Access Control Layer Control Element (MAC CE).

According to an example of the present disclosure, the precoding granularity parameter may be determined according to precoding processing capability of at least one of the terminal and the base station in step S701. For example, when the base station does not support subcarrier-level precoding, the value of the precoding granularity parameter may be determined only in {2, 4, Broadband} in step S701, even in the case of receiving the second information about PMI for a subcarrier-level precoding matrix.

In the subcarrier-level precoding technology of the embodiments of the present disclosure described above, performance of the communication system is improved by improving operation granularity of precoding processing.

According to another example of the present disclosure, subcarrier-level precoding may be performed by replacing parameters and operations related to subbands in existing precoding operations based on subbands with parameters and operations related to subcarriers. For example, a currently used Type II codebook for subbands of the wireless communication system is replaced with a Type II codebooke for subcarriers of the wireless communication system.

In addition, in applications of the existing Type II codebook, Linear Combination (LC) coefficients are independently designed in Spatial Domain (SD) and frequency domain, which leads to loss of communication system performance. In order to overcome the defects in the prior art, in addition to replacing parameters and operations related to subbands in existing precoding operations based on subbands with parameters and operations related to subcarriers, LC coefficients may also be jointly designed in the spatial domain and the frequency domain.

<Hardware Structure>

In addition, block diagrams used in the description of the above embodiments illustrate blocks in units of functions. These functional blocks (structural blocks) may be implemented in arbitrary combination of hardware and/or software. Furthermore, means for implementing respective functional blocks is not particularly limited. That is, the respective functional blocks may be implemented by one apparatus that is physically and/or logically jointed; or more than two apparatuses that are physically and/or logically separated may be directly and/or indirectly connected (e.g. wired and/or wirelessly), and the respective functional blocks may be implemented by these apparatuses.

Figure 8:
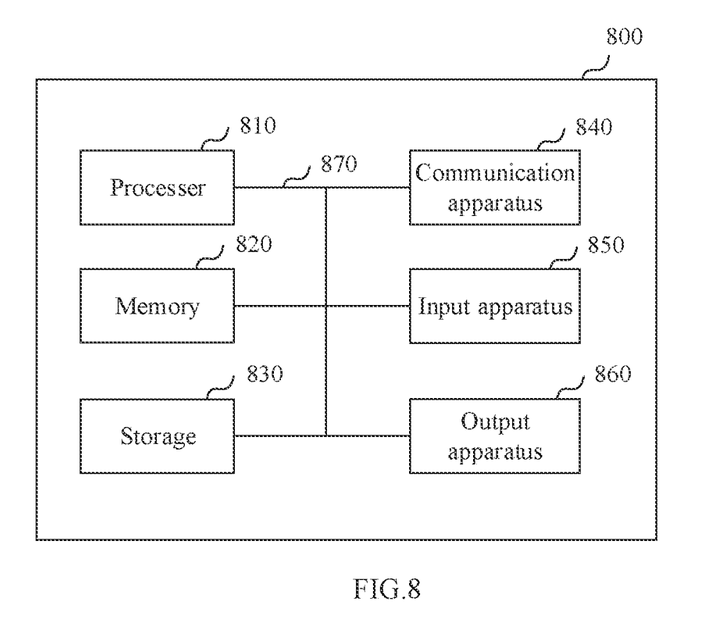
FIG. 8 is a schematic diagram of a hardware structure of a device involved in an embodiment of the present disclosure.

For example, a first network element in an embodiment of the present disclosure may function as a computer that executes the processes of the wireless communication method of the present disclosure. FIG. 8 is a schematic diagram of a hardware structure of a device 800 (a terminal and a base station) involved in an embodiment of the present disclosure. The above device 800 (the first network element) may be constituted as a computer apparatus that physically comprises a processor 810, a memory 820, a storage 830, a communication apparatus 840, an input apparatus 850, an output apparatus 860, a bus 870 and the like.

In addition, in the following description, terms such as "apparatus" may be replaced with circuits, devices, units, and the like. The hardware structure of the user terminal and the base station may include one or more of the respective apparatuses shown in the figure, or may not include a part of the apparatuses.

For example, only one processor 810 is illustrated, but there may be multiple processors. Furthermore, processes may be performed by one processor, or processes may be performed by more than one processor simultaneously, sequentially, or with other methods. In addition, the processor 810 may be installed by more than one chip.

Various functions of the device 800 may be implemented, for example, by reading specified software (program) on hardware such as the processor 810 and the memory 820, so that the processor 810 performs computations, controls communication performed by the communication apparatus 840, and controls reading and/or writing of data in the memory 820 and the storage 830.

The processor 810, for example, operates an operating system to control the entire computer. The processor 810 may be constituted by a Central Processing Unit (CPU), which includes interfaces with peripheral apparatuses, a control apparatus, a computing apparatus, a register and the like. For example, the control unit described above may be implemented by the processor 810.

In addition, the processor 810 reads programs (program codes), software modules, data and the like from the storage 830 and/or the communication apparatus 840 to the memory 820, and execute various processes according to them. As for the program, a program causing computers to execute at least a part of the operations described in the above embodiments may be employed. For example, the processing unit of the first network element may be implemented by a control program stored in the memory 820 and operated by the processor 810, and other functional blocks may also be implemented similarly.

The memory 820 is a computer-readable recording medium, and may be constituted, for example, by at least one of a Read Only Memory (ROM), an Erasable Programmable ROM (EPROM), an Electrically EPROM (EEPROM), a Random Access Memory (RAM) and other appropriate storage media. The memory 820 may also be referred to as a register, a cache, a main memory (a main storage apparatus) and the like. The memory 820 may store executable programs (program codes), software modules and the like for implementing a method involved in an embodiment of the present disclosure.

The storage 830 is a computer-readable recording medium, and may be constituted, for example, by at least one of a flexible disk, a Floppy® disk, a magneto-optical disk (e.g., a Compact Disc ROM (CD-ROM) and the like), a digital versatile disk, a Blu-ray® disk, a removable disk, a hard driver, a smart card, a flash memory device (e.g., a card, a stick and a key driver), a magnetic stripe, a database, a server, and other appropriate storage media. The storage 830 may also be referred to as an auxiliary storage apparatus.

The communication apparatus 840 is a hardware (transceiver device) performing communication between computers via a wired and/or wireless network, and is also referred to as a network device, a network controller, a network card, a communication module and the like, for example. The communication apparatus 840 may include a high-frequency switch, a duplexer, a filter, a frequency synthesizer and the like to implement, for example, Frequency Division Duplex (FDD) and/or Time Division Duplex (TDD). For example, the transmitting unit, the receiving unit and the like described above may be implemented by the communication apparatus 840.

The input apparatus 850 is an input device (e.g., a keyboard, a mouse, a microphone, a switch, a button, a sensor and the like) that receives input from the outside. The output apparatus 860 is an output device (e.g., a display, a speaker, a Light Emitting Diode (LED) light and the like) that performs outputting to the outside. In addition, the input apparatus 850 and the output apparatus 860 may also be an integrated structure (e.g., a touch screen).

Furthermore, the respective apparatuses such as the processor 810 and the memory 820 are connected by the bus 870 that communicates information. The bus 870 may be constituted by a single bus or by different buses between the apparatuses.

Furthermore, the electronic device may comprise hardware such as a microprocessor, a Digital Signal Processor (DSP), an Application Specified Integrated Circuit (ASIC), a Programmable Logic Device (PLD), a Field Programmable Gate Array (FPGA), etc., and the hardware may be used to implement a part of or all of the respective functional blocks. For example, the processor 810 may be installed by at least one of these hardware.

(Variations)

In addition, terms illustrated in the present specification and/or terms required for understanding of the present specification may be substituted with terms having the same or similar meaning. For example, a channel and/or a symbol may also be a signal (signaling). Furthermore, the signal may be a message. A reference signal may be abbreviated as an "RS", and may also be referred to as a pilot, a pilot signal and so on, depending on the standard applied. Furthermore, a component carrier (CC) may also be referred to as a cell, a frequency carrier, a carrier frequency, and the like.

Furthermore, information, parameters and so on described in this specification may be represented in absolute values or in relative values with respect to specified values, or may be represented by other corresponding information. For example, radio resources may be indicated by specified indexes. Furthermore, formulas and the like using these parameters may be different from those explicitly disclosed in this specification.

Names used for parameters and the like in this specification are not limited in any respect. For example, since various channels (Physical Uplink Control Channels (PUCCHs), Physical Downlink Control Channels (PDCCHs), etc.) and information elements may be identified by any suitable names, the various names assigned to these various channels and information elements are not limitative in any respect.

Information, signals and the like described in this specification may be represented by using any of a variety of different technologies. For example, data, instructions, commands, information, signals, bits, symbols, chips, etc. possibly referenced throughout the above description may be represented by voltages, currents, electromagnetic waves, magnetic fields or particles, optical fields or photons, or any combination thereof.

In addition, information, signals and the like may be output from higher layers to lower layers and/or from lower layers to higher layers. Information, signals and the like may be input or output via a plurality of network nodes.

Information, signals and the like that are input or output may be stored in a specific location (for example, in a memory), or may be managed through a management table. Information, signals and the like that are input or output may be overwritten, updated or appended. Information, signals and the like that are output may be deleted. Information, signals and the like that are input may be transmitted to other apparatuses.

Reporting of information is by no means limited to the manners/embodiments described in this specification, and may be implemented by other methods as well. For example, reporting of information may be implemented by using physical layer signaling (for example, Downlink Control Information (DCI), Uplink Control Information (UCI)), higher layer signaling (for example. Radio Resource Control (RRC) signaling, broadcast information (Master Information Blocks (MIBs), System Information Blocks (SIBs), etc.), Medium Access Control (MAC) signaling), other signals or combinations thereof.

In addition, physical layer signaling may also be referred to as L1/L2 (Layer 1/Layer 2) control information (L1/L2 control signals). L1 control information (L1 control signal) and the like. Furthermore, RRC signaling may also be referred to as RRC messages, for example, RRC connection setup messages, RRC connection reconfiguration messages, and so on. Furthermore, MAC signaling may be reported by using, for example, MAC Control Elements (MAC CEs).

Furthermore, notification of prescribed information (for example, notification of "being X") is not limited to being performed explicitly, and may be performed implicitly (for example, by not performing notification of the prescribed information or by notification of other information).

Decision may be performed by a value (0 or 1) represented by 1 bit, or by a true or false value (Boolean value) represented by TRUE or FALSE, or by a numerical comparison (e.g., comparison with a prescribed value).

Software, whether referred to as "software". "firmware". "middleware", "microcode" or "hardware description language", or called by other names, should be interpreted broadly to mean instructions, instruction sets, code, code segments, program codes, programs, subprograms, software modules, applications, software applications, software packages, routines, subroutines, objects, executable files, execution threads, procedures, functions and so on.

In addition, software, commands, information, etc. may be transmitted and received via a transport medium. For example, when software is transmitted from web pages, servers or other remote sources using wired technologies (coaxial cables, fibers, twisted pairs, Digital Subscriber Lines (DSLs), etc.) and/or wireless technologies (infrared ray, microwave, etc.), these wired technologies and/or wireless technologies are included in the definition of the transport medium.

The terms "system" and "network" used in this specification may be used interchangeably.

In this specification, terms like "Base Station (BS)", "wireless base station", "eNB", "gNB", "cell", "sector", "cell group", "carrier" and "component carrier" may be used interchangeably. A base station is sometimes referred to as terms such as a fixed station, a NodeB, an eNodeB (eNB), an access point, a transmitting point, a receiving point, a femto cell, a small cell and the like.

A base station is capable of accommodating one or more (for example, three) cells (also referred to as sectors). In the case where the base station accommodates a plurality of cells, the entire coverage area of the base station may be divided into a plurality of smaller areas, and each smaller area may provide communication services by using a base station sub-system (for example, a small base station for indoor use (a Remote Radio Head (RRH)). Terms like "cell" and "sector" refer to a part of or an entirety of the coverage area of a base station and/or a sub-system of the base station that provides communication services in this coverage.

In this specification, terms such as "Mobile Station (MS)", "user terminal", "User Equipment (UE)", and "terminal" may be used interchangeably. The mobile station is sometimes referred by those skilled in the art as a user station, a mobile unit, a user unit, a wireless unit, a remote unit, a mobile device, a wireless device, a wireless communication device, a remote device, a mobile user station, an access terminal, a mobile terminal, a wireless terminal, a remote terminal, a handset, a user agent, a mobile client, a client, or some other appropriate terms.

Furthermore, a wireless base station in this specification may also be replaced with a user terminal. For example, for a structure in which communication between a wireless base station and a user terminal is replaced with communication between a plurality of user terminals (Device-to-Device, D2D), the respective manners/embodiments of the present disclosure may also be applied. In this case, functions provided by the electronic device described above may be regarded as functions provided by a user terminal. Furthermore, the words "uplink" and "downlink" may also be replaced with "side". For example, an uplink channel may be replaced with a side channel.

Also, a user terminal in this specification may be replaced with a wireless base station. In this case, functions provided by the above user terminal may be regarded as functions provided by a first communication device or a second communication device.

In this specification, specific actions configured to be performed by the base station sometimes may be performed by its upper nodes in certain cases. Obviously, in a network composed of one or more network nodes having base stations, various actions performed for communication with terminals may be performed by the base stations, one or more network nodes other than the base stations (for example, Mobility Management Entities (MMEs). Serving-Gateways (S-GWs), etc., may be considered, but not limited thereto)), or combinations thereof.

The respective manners/embodiments described in this specification may be used individually or in combinations, and may also be switched to use during execution. In addition, orders of processes, sequences, flow charts and so on of the respective manners/embodiments described in this specification may be re-ordered as long as there is no inconsistency. For example, although various methods have been described in this specification with various units of steps in exemplary orders, the specific orders as described are by no means limitative.

The manners/embodiments described in this specification may be applied to systems that utilize Long Term Evolution (LTE), Advanced Long Term Evolution (LTE-A, LTE-Advanced), Beyond Long Term Evolution (LTE-B, LTE-Beyond), the super 3rd generation mobile communication system (SUPER 3G), Advanced International Mobile Telecommunications (IMT-Advanced), the 4th generation mobile communication system (4G), the 5th generation mobile communication system (5G), Future Radio Access (FRA), New Radio Access Technology (New-RAT). New Radio (NR), New radio access (NX). Future generation radio access (FX), Global System for Mobile communications (GSM @). Code Division Multiple Access 3000 (CDMA 3000), Ultra Mobile Broadband (UMB), IEEE 920.11 (Wi-Fi®), IEEE 920.16 (WiMAX®), IEEE 920.20, Ultra-Wide Band (UWB), Bluetooth® and other appropriate wireless communication methods, and/or next-generation systems that are enhanced based on them.

Terms such as "based on" as used in this specification do not mean "based on only", unless otherwise specified in other paragraphs. In other words, terms such as "based on" mean both "based on only" and "at least based on."

Any reference to units with designations such as "first", "second" and so on as used in this specification does not generally limit the quantity or order of these units. These designations may be used in this specification as a convenient method for distinguishing between two or more units. Therefore, reference to a first unit and a second unit does not imply that only two units may be employed, or that the first unit must precedes the second unit in several ways.

Terms such as "deciding (determining)" as used in this specification may encompass a wide variety of actions. The "deciding (determining)" may regard, for example, calculating, computing, processing, deriving, investigating, looking up (e.g., looking up in a table, a database or other data structures), ascertaining, etc. as performing the "deciding (determining)". In addition, the "deciding (determining)" may also regard receiving (e.g., receiving information), transmitting (e.g., transmitting information), inputting, outputting, accessing (e.g., accessing data in a memory), etc. as performing the "deciding (determining)". In addition, the "deciding (determining)" may further regard resolving, selecting, choosing, establishing, comparing, etc. as performing the "deciding (determining)". That is, the "deciding (determining)" may regard certain actions as performing the "deciding (determining)".

As used herein, terms such as "connected", "coupled", or any variation thereof mean any direct or indirect connection or coupling between two or more units, and may include the presence of one or more intermediate units between two units that are "connected" or "coupled" to each other. Coupling or connection between the units may be physical, logical or a combination thereof. For example, "connection" may be replaced with "access." As used in this specification, two units may be considered as being "connected" or "coupled" to each other by using one or more electrical wires, cables and/or printed electrical connections, and, as a number of non-limiting and non-inclusive examples, by using electromagnetic energy having wavelengths in the radio frequency region, microwave region and/or optical (both visible and invisible) region.

When terms such as "including", "comprising" and variations thereof are used in this specification or the claims, these terms, similar to the term "having", are also intended to be inclusive. Furthermore, the term "or" as used in this specification or the claims is not an exclusive or.

Although the present disclosure has been described above in detail, it should be obvious to a person skilled in the art that the present disclosure is by no means limited to the embodiments described in this specification. The present disclosure may be implemented with various modifications and alterations without departing from the spirit and scope of the present disclosure defined by the recitations of the claims. Consequently, the description in this specification is for the purpose of illustration, and does not have any limitative meaning to the present disclosure.

The invention claimed is:

1. A terminal comprising:
    a receiving unit configured to receive first information about a precoding matrix indicator (PMI) from a base station; and
    a control unit configured to determine whether to transmit second information about the precoding matrix indicator according to the first information, wherein the precoding matrix indicator is for a subcarrier-level precoding matrix;
    wherein when the first information includes a precoding feedback granularity indication parameter, the control unit determines to transmit the second information about the precoding matrix indicator, wherein the precoding matrix indicator is for a subcarrier-level precoding matrix.

2. The terminal of claim 1, when it is determined to feed back the indicator for a subcarrier-level precoding matrix, wherein
    the control unit is further configured to perform subcarrier-level measurement and estimation of channel state information according to a reference signal.

3. The terminal of claim 1, wherein the control unit determines whether to transmit the second information about the precoding matrix indicator according to a value of a precoding feedback granularity indication parameter in the first information, wherein the precoding matrix indicator is for a subcarrier-level precoding matrix.

4. The terminal of claim 1, wherein
    the first information includes a parameter about a number of precoding matrices indicated by the precoding matrix indicator,
    the control unit determines whether to transmit the second information of the precoding matrix indicator for subcarrier level according to the parameter about the number of precoding matrices indicated by the precoding matrix indicator.

5. A terminal comprising:
    a receiving unit configured to receive third information including a precoding granularity parameter from a base station; and
    a control unit configured to determine, according to the precoding granularity parameter, whether the base station has performed subcarrier-level precoding on downlink signals.

6. A base station, comprising:
    a control unit configured to determine a precoding granularity parameter, wherein the precoding granularity parameter is used to indicate whether downlink signals have undergone subcarrier-level precoding; and a transmitting unit configured to transmit third information including the precoding granularity parameter to a terminal.

7. The base station of claim 6, wherein the control unit determines the precoding granularity parameter according to precoding processing capability of at least one of the terminals and the base station.

* * * * *